June 22, 1971  AKIRA MORIWAKI  3,585,706
METHOD OF MANUFACTURING A COMBING CYLINDER
FOR A COMBING MACHINE
Original Filed June 21, 1966  4 Sheets-Sheet 1

June 22, 1971  AKIRA MORIWAKI  3,585,706
METHOD OF MANUFACTURING A COMBING CYLINDER
FOR A COMBING MACHINE
Original Filed June 21, 1966    4 Sheets-Sheet 4

United States Patent Office 3,585,706
Patented June 22, 1971

3,585,706
METHOD OF MANUFACTURING A COMBING CYLINDER FOR A COMBING MACHINE
Akira Moriwaki, Ikeda-shi, Japan, assignor to Nitto Shoji Kabushiki Kaisha, Osaka, Japan
Original application June 21, 1966, Ser. No. 559,186, now Patent No. 3,419,941, dated Jan. 7, 1969. Divided and this application Apr. 29, 1968, Ser. No. 724,944
Int. Cl. B23p 17/00
U.S. Cl. 29—423      4 Claims

ABSTRACT OF THE DISCLOSURE

A method of manufacturing a combing cylinder for a combing machine in which a plurality of bands, each having a segment of its periphery provided with teeth for combing textile fibers, are arranged axially on a temporary carrier or support, releasably bonded together in relative positions, and then removed from the carrier or support. The bonding material then acts as a carrier or support and holds the bands in assembly while the toothed segments are removed therefrom and assembled on a cylindrical member, and jointly defining therewith a complete combing cylinder. The bands may be developed by winding a wire having peripheral teeth on a core carrier or support and then applying a bonding agent such as a resin or a solder to the bands to hold them in their relative positions. The toothed segment of each band is removed from the remainder thereof and then assembled into the complete combing cylinder. The bands may be individual rings assembled axially to form an elongated toothed segment which is removed from the rings. Prior to removal of the toothed segment, the rings are bonded together by a resin or metallic alloy solder and then the segment, or several similar segments, are joined with another elongated segment free of teeth in fixed relative positions, thereby defining a complete combing cylinder.

This is a divisional application of my copending application Ser. No. 559,186 filed June 21, 1966.

The present invention relates to a method for manufacturing an improved combing cylinder of a combing machine.

In the conventional process of cotton or worsted spinning three types of combing machines, that is, Nasmith type comber, Hellman type comber and Noble comber have been used. Particularly, the former two types of combers have been used widely in cotton and worsted spinning processes respectively. However, the same combing principle has been used as the combing action of the above-mentioned combers up to the present. For example, in the combing action, a web of fibers is gripped between a pair of gripping members, such as a nipper knife and a nipper plate of a Nasmith type comber, and is combed by a needle segment attached to a combing cylinder in such a manner that the web is combed roughly in the first step of combing and is combed finer in stages. To operate the above-mentioned comber for combing the web, the needles of the first segment, having thick cross sectional diameters are embedded with low density on a first base element; the needles of the second segment, having finer cross sectional diameters, are embedded more densely on a second base element; and, the needles of the third segment having still finer cross-sectional areas are embedded even more densely on a third base element, and so on. Each needle has a straight shape and each needle segment is disposed on the combing cylinder in such a manner that each needle point inclines toward the rotational direction of the combing cylinder so that each needle point can stab the web easily. To obtain fine combing action, it has been necessary to use needles of a small diameter, although the possibility is great that the points of the needles will break easily. Therefore, in the conventional combing operation, it has been desirable to carry out the combing action at a low speed in order to prevent breakage of the needle and to have good, continuous combing action.

Depending on the inclination of the needles toward the direction of rotation of the combing cylinder, some fibers and impurities have a tendency to be carried to the bottom portion of spaces between needles, and, therefore, it is necessary to remove the fibers disposed on the needle segments by suitable mechanical means, such as pneumatic means, for keeping the needle segment in a clean condition. As it is well known, the quantity of fibers disposed on the needle segment, hereinafter called waste, should be controlled from the point of view of yarn quality and production cost of combed yarn. Therefore, the setting of the needle segment on the combing cylinder should be made carefully.

A principal object of the present invention is to provide a method for manufacturing an improved combing cylinder having a combing segment comprising a base plate and plurality of saw teeth or curved needles rigidly secured to the base plate of the combing machine for cotton or wool spinning.

Other features and advantages of the invention will be apparent from the ensuing description with reference to the accompanying drawings to which the scope of the invention is in no way limited.

Figure 1:
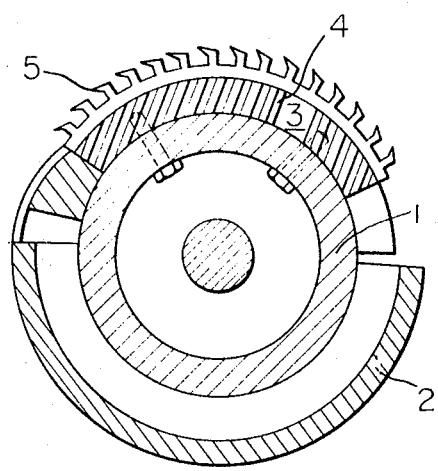
FIG. 1 is a cross section view of an embodiment of a combing cylinder produced by the method of the present invention.
Figure 3:
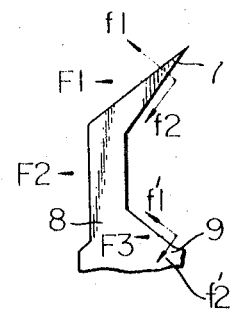
FIG. 3 is an explanatory diagram for illustrating the combing action by the metallic wire produced by the method according to the present invention.
Figure 2A:
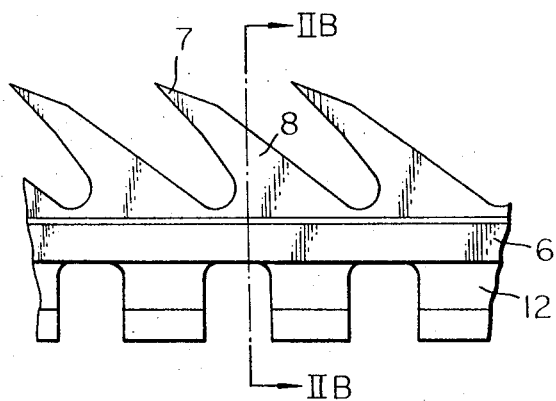
FIG. 2A is a fragmentary side view of an embodiment of a metallic wire for use in the combing cylinder in FIG. 1.
Figure 2B:
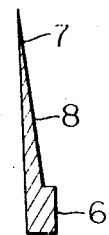
FIG. 2B is a sectional view, taken along section line 2B—2B of the metallic wire in FIG. 2.

The combing cylinder of the present invention has superior features when used in a Nasmith type comber or a Hellman type comber as described below. In FIG. 1, a combing cylinder produced by the method of the present invention is illustrated and comprises a base cylinder 1 and a plain segment 2 mounted thereon. A combing segment 3 is also secured to the base cylinder 1. The combing segment comprises saw-toothed members 5 having a plurality of saw-teeth, and a base member 4 made of thermosetting synthetic material for fixing the saw-toothed members 5 to the base cylinder 1. The base member 4 has a uniform thickness and is fitted to the base cylinder 1. The saw-toothed members 5 are disposed on the cylindrical surface of the base member 4 by way of the thermosetting resin, in such a way that the longitudinal body portion of each saw-tooth is perpendicular to the axial direction of the cylinder 1, or inclined toward the axial direction of the cylinder 1. The intervals or spacing of the saw-toothed members are constant. As shown in FIGS. 2A, 2B and 3, each saw-toothed member comprises a base portion 6 and a plurality of saw-teeth positioned on the base portion 6. Each saw-tooth has a point portion 7 which inclines toward the rotational direction of the combing cylinder, a vertical stem portion 8 and a root portion 9, as shown in the drawing.

Therefore, when the combing cylinder rotates and the points of the saw-teeth stab a web gripped between a nipper plate and a nipper knife of the combing machine, not shown, fibers are engaged by the vertical stem portion 8 of each saw-tooth and are combed thoroughly by the respective stem portion 8. That is, as shown in FIG. 3, the gripped fibers are pushed in the direction of the forces F1, F2 and F3, by the rotation of the combing cylinder 1. Two divided forces or components $f1$, $f2$ whose directions are respectively vertical to and parallel to the face edge of the top portion 7, can be considered as the force F1, and two divided forces or components $f1'$, $f2'$ which are vertical to and parallel to the face edge of the bottom portion 9 of each saw-tooth, can be considered as the force F2. The fibers which are pushed to the face edge of each saw-tooth are brought to the stem portion 8 by the force component $f2$, and the force component $f2'$ prevents the fibers from going to the base portion 9 of the saw-tooth. Therefore, the fibers of the web are combed by the top portion and the stem portion of the saw-tooth, and there is little possibility of fibers remaining in the combing segment after its combing action. If some fibers are disposed in the combing segment by separation from the web, these can be removed easily by conventional means for cleaning the combing cylinder.

Thus, since the metallic wire saw-teeth are disposed on the surface of the combing cylinder with the same lateral intervals or spacing and with a side face having some inclination up to 45° toward the rotational axis of the combing cylinder, the webs gripped between the nipper plate and the nipper knife can be combed very finely because of the above-mentioned tooth inclination and the density of the saw-teeth. This combing action, which is provided during one rotation of the combing cylinder, comprises a principal advantage of using a combing cylinder made according to the invention.

Figure 4A:
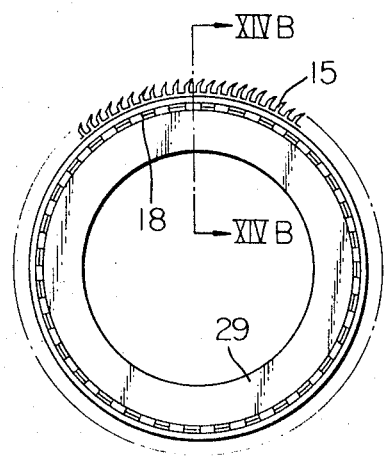
FIGS. 4A, 4B, 4C, 4D, 4E and 4F are section views explanatory of an embodiment for manufacturing a combing cylinder according to the present invention.
Figure 4B:
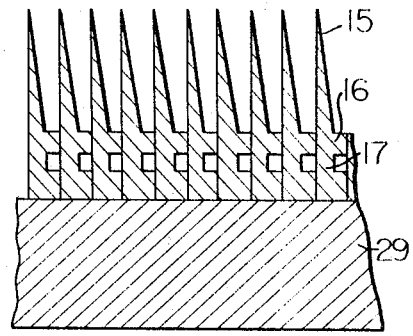
Figure 4C:
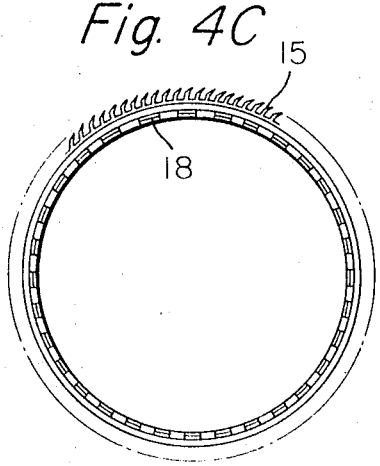

Method of manufacturing the device, as illustrated in FIGS. 4A, 4B, 4C, 4D, 4E and 4F, a metallic wire 15 having teeth having the same base construction as that shown in FIG. 2A is wound around a cylinder 29 in such way that the bases of the adjacent wire convolutions or bands contact each other as shown in FIG. 4B and an axial length of a cylinder 29, having the metallic wire 15 with teeth wound thereon corresponds exactly to that of a combing segment secured to a desired combing cylinder. Therefore, a cylindrical reticulate space comprising a plurality of recesses 18 and side grooves 17 is formed between the metallic wire 15 and the cylindrical surface of the cylinder 29.

A thermosetting resin, such as epoxy or polyester resin in a liquid condition containing a hardener, is poured into the above-mentioned spaces. After the resin has set, the cylinder 29 is separated from the cylindrical metallic wire 15, which is rigidly formed by the thermosetting resin of reticulate form. The cylindrical metallic wire 15 is supported coaxially by a core cylinder 31 by a suitable mechanical means, then thermosetting resin in liquid form containing a hardener as mentioned above is poured into a space 30 which is formed coaxially between the inner surface of the cylindrical metallic wire 15 and the outer surface of the core cylinder 31 while both sides of the core are sealed by a suitable mechanical means. The thermosetting resin is subjected to hardening by conventional manner, for example, maintaining at room temperature for a suitable time.

Figure 4D:
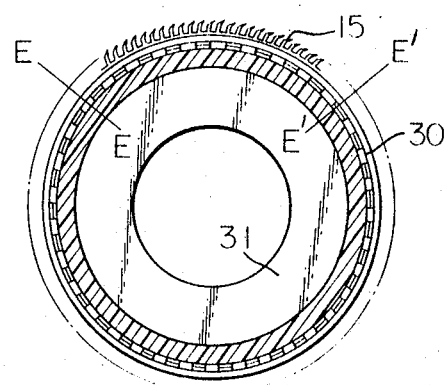
Figure 4E:
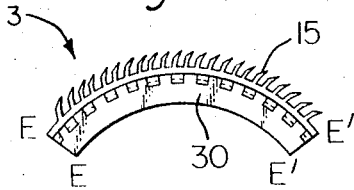
Figure 4F:
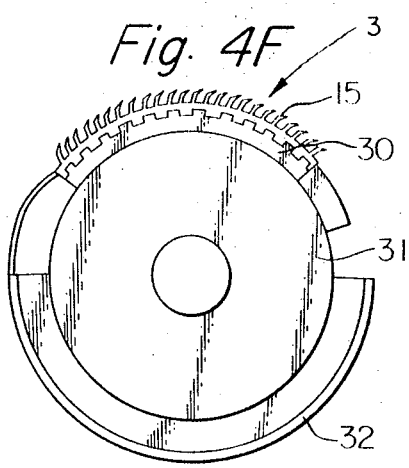

After the thermosetting resin has hardened completely, the core cylinder is removed from the product of the above-mentioned process, and then the product is cut into a suitable size, for example, cut into a segment 3 having a fan-shaped section defined by lines E—E, E'—E', as shown in the drawing in FIGS. 4D and 4E. The outer diameter of the core cylinder 31 is defined as the same diameter as that of a base cylinder 1 of the combing cylinder. Therefore, the setting of the combing segment 3 on the base cylinder 1 is easily performed by simple mechanical means, such as using the usual fastness, that is, bolts or screws etc. In the drawing of a combing cylinder in FIG. 4F, a plain cylindrical part or segment 32 is also secured to the base cylinder 1.

Figure 5A:
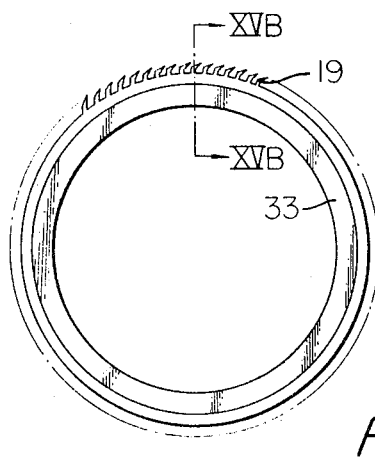
FIGS. 5A, 5B, 5C, 5D, 5E and 5F are sectional views of another embodiment of a combing cylinder according to the present invention.
Figure 5B:
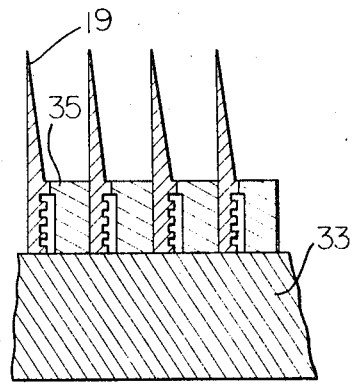
Figure 5C:
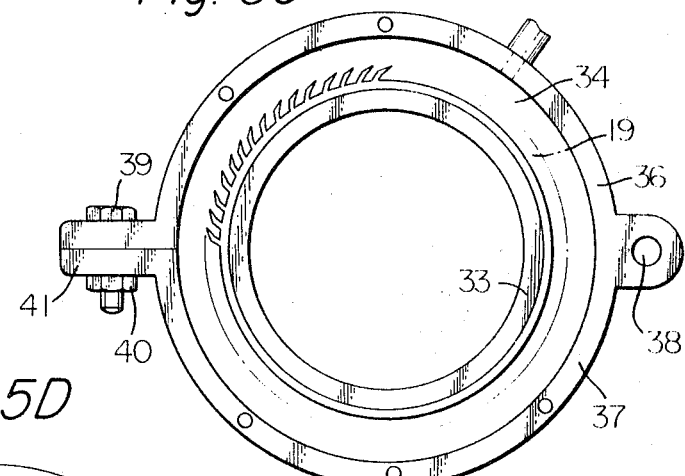
Figure 5D:
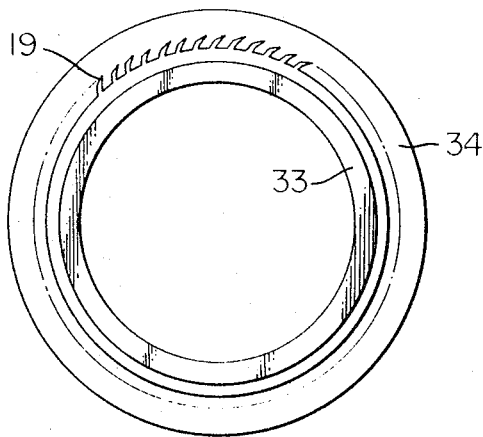

Another method for manufacturing a combining cylinder according to the invention is described as follows. A metallic wire 19, as shown in FIGS. 5A, 5B, 5C, 5D, 5E and 5F, has the same basic construction as that of the metallic wire heretofore described and is wound spirally around a cylinder 33 in such way that the bases of the adjacent wire convolutions or bands contact each other as shown in the drawing of the above-mentioned first embodiment in FIG. 4B. However, when it is necessary to have a low density of saw-teeth in the lateral direction of the segment, axially of a combing cylinder an intervening flat wire 35 is wound around the cylinder 33 so as to intervene or act as a spacer between adjacent spirals of the metallic wire as shown in the drawing of FIG. 5B. The axial length of the cylinder 33 wound by the metallic wire 19 corresponds exactly to that of a combing segment secured to a desired combining cylinder. The cylindrical metallic wire 19 together with cylinder 33, is supported coaxially by a circular shell comprising two elements 36 and 37 which are pivoted by a pin 38, so that element 36 can be opened around the pin 38, and are clamped by a bolt 39 and nut 40 at the other side 41, as shown in FIG. 5C. Therefore, a cylindrical space 34 is formed coaxially between the inner surface of the circular shell and the outer surface of the above-mentioned metallic wire 19. A substance which melts at a comparative low temperature, such as wax or some metallic alloy such as solder is poured in a melted condition into the space 34 while both sides of the cylindrical space 34 are covered by a suitable mechanical means. After solidification of the substance, the shell is removed from the product, which forms a rigid cylindrical metallic wire at normal temperatures.

Figure 5E:
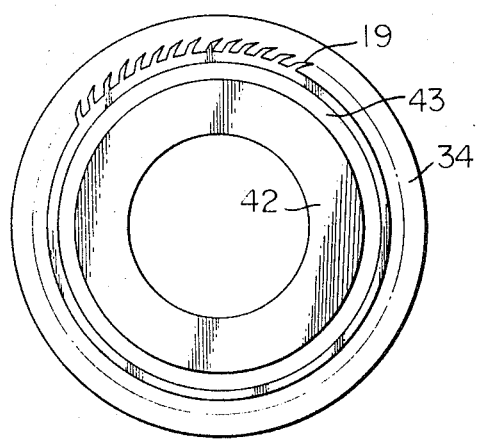
Figure 5F:
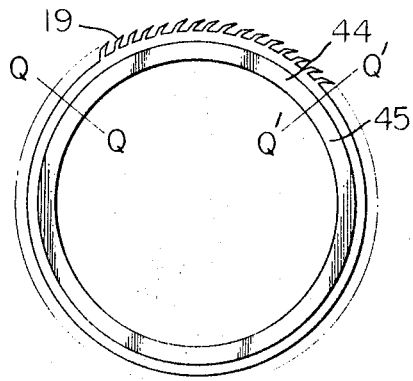

The product is then supported coaxially by a core cylinder 42 as shown in FIG. 5E, so as to form a coaxial space 43 between the inner surface of the cylinder metallic wire 19 and the core cylinder 42. A thermosetting resin, in a melted condition and containing a hardener, is poured into the space 43 while both sides of the coaxial space 43 are covered by suitable mechanical means, and the thermosetting resin is subjected to hardening by conventional means, as described in the first embodiment of the method of the invention. After the thermosetting resin has hardened completely the substance covering the outer surface of the metallic wire is removed by suitable thermal means which melts the substance. Then the cylindrical metallic wire secured to the cylindrical thermosetting resin 45 is cut into a suitable size, for example, cut into a segment 44 having a fan-shaped section. The outer diameter of the core cylinder 42 is defined as the same diameter as that of a base cylinder of the combing cylinder, therefore, the setting of the combing segment on the base cylinder can be performed in the same manner as explained in the first embodiment of the invention.

Figure 6A:
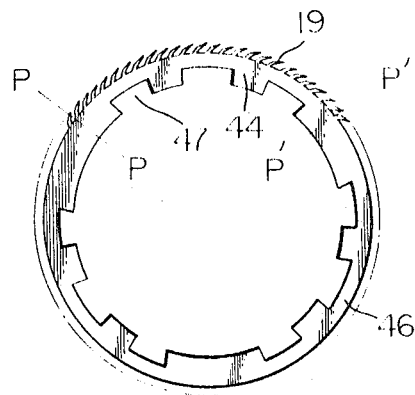
FIGS. 6A, 6B and 6C are section views of another embodiment of a combing cylinder according to the invention.
Figure 6B:
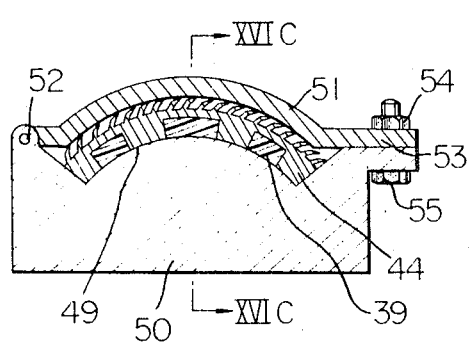
Figure 6C:
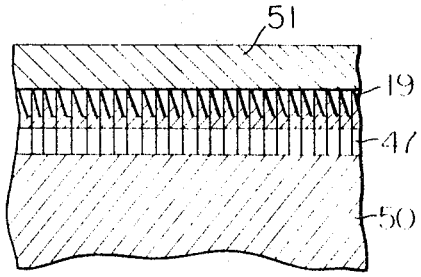

Apparatus related to another embodiment of practicing the method of invention, as shown in FIGS. 6A, 6B and 6C, comprises a plurality of fan-shaped metallic plates each having a plurality of saw-teeth disposed on its outer periphery. A plurality of circular ring-shaped metallic plates or rings 46 constituting bands are produced by a suitable mechanical means such as a press. Each plate 46 is provided with a segment having a plurality of saw-teeth each tooth having a sharp point disposed on its outer surface or perpihery. Each segment also has a plurality of recesses 47 having a wedge shape disposed on the inner surface. Each plate 36 is cut into a fan-shaped form 44 defined by lines P—P, P'—P' as shown in FIG. 6A so as to correspond to the size of the combining segment. The fan-shaped plates 44 are disposed on the curved bottom surface of a recess 49 of a support member 50 which is provided with the recess 49 having the same shape as that of bottom surface of the combing segment of the desired combing cylinder. The curvature of the bottom surface of the recess 49 is the same as that of the outer surface of the base cylinder of the combing cylinder. The manner of disposing the fan-shaped plates 44 on the recess 49 is clearly shown in the drawing in FIG. 6C; that is, the plates 44 are disposed vertically on the bottom surface of the recess in such a manner that the adjacent plates closely contact each other at their base portion. Therefore, lateral grooves having a wedge-shaped cross section are formed between the plates and the bottom surface of the recess 49 of the support member 50. The setting angle of the plates to the imaginary axis of the curved bottom surface of the recess 49 can be chosen in accordance with both side walls of the recess 49 in such a manner that the side walls, not shown, are set with a certain setting angle to the imaginary axis of the curved bottom surface of the recess 49 which may be explained as an axis perpendicular to the surface of the sheet of FIG. 6B.

The support member 50 is provided with a supporting cover 51 which is pivoted by a pin 52 at one side and provided with a clamp jaw 53 at the other side, as shown in the drawing. The clamping of the jaw 53 to the support member 50 is performed by a bolt 54 and a nut 55. After disposing a plurality of plates 48 in the recess 49 in a condition as explained above, and positioning closely contacting plates at both sides of the plurality of plates thereby closing the ends of the recess 49 a thermosetting resin in a liquid condition and containing a hardener is poured into the groove 47 by suitable means, as described in the first embodiment of the method of the invention. After the thermosetting resin has hardened completely, the rigid product of the metallic plates bonded by the resin is taken from the support member 50 and secured on a base cylinder in the same manner as that of the first embodiment of the invention, but the fastening position of the combing segment to the base cylinder should be chosen so that it is at the portion of the hardened thermosetting resin.

In the above-mentioned embodiments of the method for manufacturing a combing cylinder, a suitable thermosetting resin is used for forming a base member of the combing segment. However, other materials for forming the base member of the combing segment, such as some metallic alloy which melts at a comparatively low temperature, can be used as a substitute for the above-mentioned thermosetting resin. In case solder is used for making the base member of the combing cylinder according to the method of the above-mentioned first embodiment illustrated by FIGS. 4A, 4B, 4C, 4D and 4F, the core cylinder 31 should be covered by some releasing agent to permit easy separation of the core cylinder from a base cylindrical member 30 made of solder. Where solder for making the base member of the combing cylinder is used according to the second embodiment of the method, it is necessary to use a substance for filling the cylindrical space 34 having a lower melting point than that of substance for filling the cylindrical space 43. If solder is used in making the base member of the combing cylinder according to the third embodiment, the support member 50, again, should have the surface of the recess 49 covered by some releasing agent to permit easy separation of the base of the segment from the recess 49 of the supporting member 50. As described above, in the three embodiments of the method for manufacturing a combing cylinder, the setting of the combing segment on the base cylinder can be carried out precisely and simply in a short time. Therefore, maintenance of the combing cylinder, which is an important part of a combing machine, can be carried out effectively at a lower cost than that of a conventional combing machine.

Combing cylinders produced in accordance with result in products wherein; the cleaning of the combing segment for taking off waste is not necessary for long periods of operation. This advantage is important since cleaning the combing segment of the cylinder of a conventional combing machine is one of the key points of maintenance of the machine for obtaining good combing action.

While preferred embodiments of the method of manufacture of combing cylinders according to the invention have been shown in the drawings and described in detail above, it should be understood that various modifications may be made which would be equally within the spirit and scope of the invention, and that the true measure of the invention is as defined in the hereinafter set forth claims.

What I claim and desire to be secured by Letters Patent is:

1. A method of manufacturing a combing cylinder for a combing machine comprising the steps of coaxially arranging a plurality of arcuate segments of bands, each segment having peripheral teeth, fixing said segments in said coaxial arrangement to thereby provide a toothed combing segment for a combing cylinder, and fixing a toothless arcuate segment of a cylinder to said toothed combing segment to define a complete combing cylinder.

2. A method of manufacturing a combing cylinder for a combing machine comprising the steps of coaxially arranging a plurality of peripherally toothed bands on a shaft to dispose the teeth arcuately, fixing said bands together in said coaxial arrangement, cutting said fixed bands to provide a toothed arcuate segment and fixing a toothless arcuate segment of a cylinder to said toothed combing segment to define a complete combing cylinder.

3. A method of manufacturing a combing cylinder for a combing machine comprising the steps of winding a toothed metallic wire spirally around a first cylindrical support, said wire having transverse grooves adjacent said support, and having each convolution thereof spaced from adjacent convolutions to provide a reticulate pattern of grooves and spaces; filling said grooves and spaces with a thermosetting resin; disengaging said first support from said metallic wire convolutions after solidification of said resin; inserting said metallic wire convolutions over a second cylindrical support to provide a cylindrical space between said convolutions and second cylinder; filling said cylindrical space with a thermosetting resin; disengaging said second support from said metallic wire convolutions after solidification of said resin; and cutting said metallic wire convolutions in a direction parallel to an axial direction of said convolutions to provide a combing segment of a combing cylinder.

4. A method of manufacturing a combing cylinder for a combing machine comprising the steps of winding a toothed metallic wire spirally around a periphery of a first cylindrical support with a given intervening distance between bases of adjacent metallic wire convolutions; inserting a cylinder over said wound metallic wire convolutions to provide a first cylindrical space around said toothed wire convolutions; filling said first cylindrical space with a low temperature meltable substance; disengaging said metallic wire convolutions from said cylinder and said first cylindrical support after solidification of said substance; inserting a second cylindrical support into said wire convolutions to provide a second cylindrical space between said convolutions and said second support; filling a thermosetting resin into said second cylindrical space; thermally removing said low temperature meltable substance after solidification of said resin; removing said second support; and cutting said metallic wire convolutions in a direction parallel to an axial direction of said convolutions to provide a combing segment of a combing cylinder.

References Cited

UNITED STATES PATENTS

| | | | |
|---|---|---|---|
| 542,605 | 7/1895 | Clay et al. | 19—97 |
| 1,346,637 | 7/1920 | Coulston | 19—97 |
| 1,892,317 | 12/1932 | Nasmith | 19—234X |
| 3,135,024 | 6/1964 | Nydam | 19—234 |
| 3,182,276 | 5/1965 | Ruehlemann | 29—630X |

JOHN F. CAMPBELL, Primary Examiner

V. A. DI PALMA, Assistant Examiner

U.S. Cl. X.R.

19—234; 29—469